D. J. HAVENSTRITE.
APPARATUS FOR HARVESTING AND CUTTING PLATE ICE.
APPLICATION FILED AUG. 17, 1908.
940,013.
Patented Nov. 16, 1909.
3 SHEETS—SHEET 3.
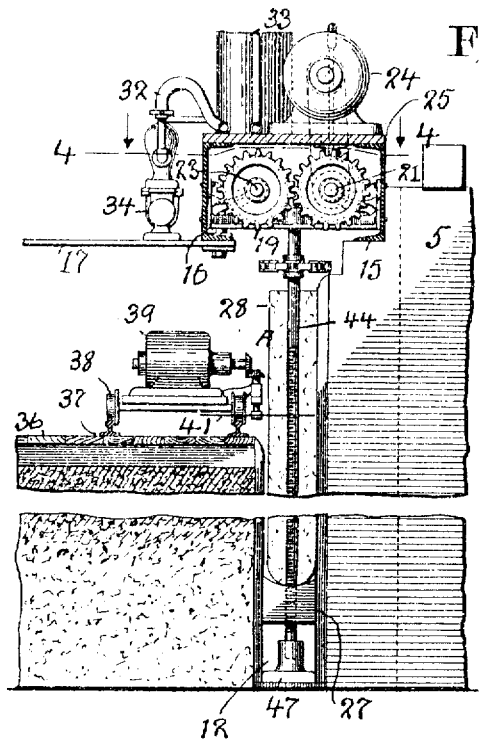
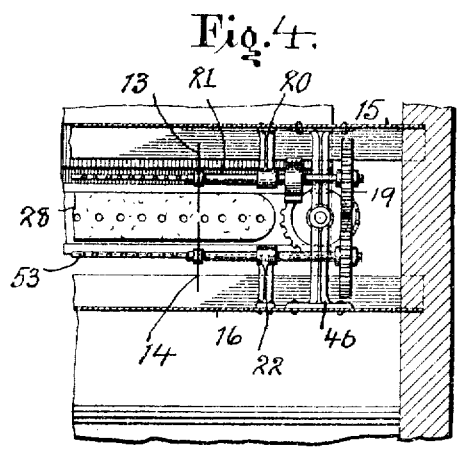
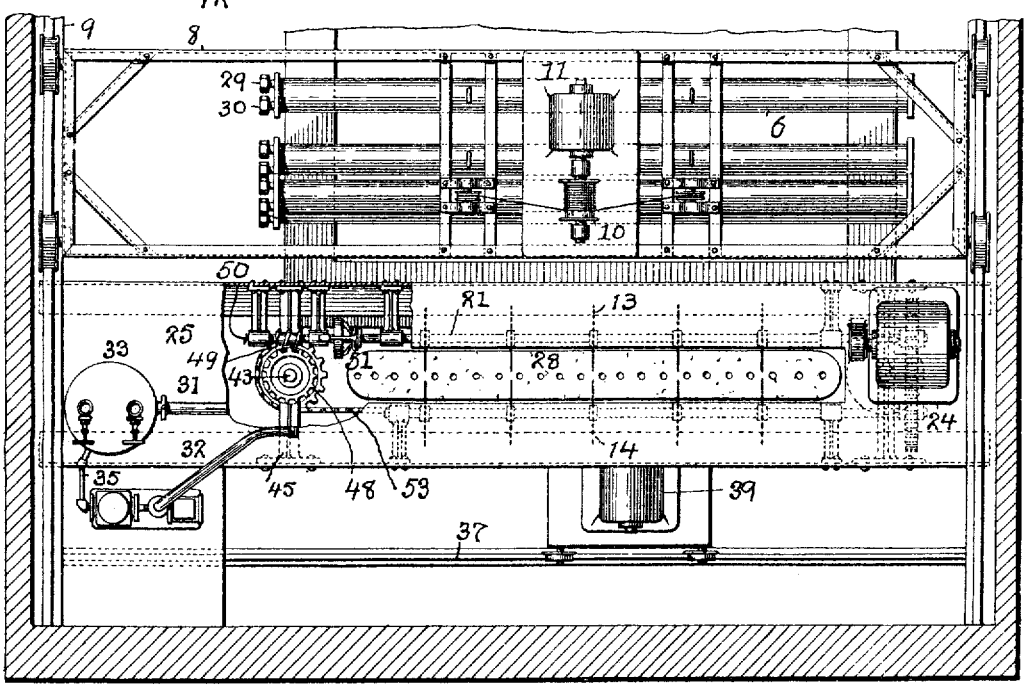

UNITED STATES PATENT OFFICE.

DAVID J. HAVENSTRITE, OF NEWARK, NEW JERSEY.

APPARATUS FOR HARVESTING AND CUTTING PLATE-ICE.

940,013.        Specification of Letters Patent.    Patented Nov. 16, 1909.

Application filed August 17, 1908. Serial No. 448,879.

*To all whom it may concern:*

Be it known that I, DAVID J. HAVENSTRITE, a citizen of the United States, residing at Newark, in the county of Essex and State of New Jersey, have invented a certain new and useful Improvement in an Apparatus for Harvesting and Cutting Plate-Ice, of which the following is a specification.

The invention is an apparatus for harvesting and cutting plate ice. Said apparatus embodies two oppositely disposed gangs of circular saws, between which the ice cake is lowered while still adherent to the freezing tubes, which saws operating on opposite sides of the cake, divide the same into vertical strips, which continue adherent to the tubes and are received in a receptacle which also serves to guide the cake during its descent. After the tubes are thawed off and removed, a carriage, wherein is disposed a rotary horizontal circular saw, is moved across the face of the cake dividing the same horizontally, and the blocks above the saw-cut are taken away. The vertically moving bottom piece in said receptacle, upon which said cake rests, is then raised to expose a new part of the cake to the action of the horizontal cutter, whereby another tier of blocks is separated, and the cake continues to be raised intermittently until the whole is subdivided into blocks or fractions of suitable commercial size.

The invention consists in the various combinations including the aforesaid mechanisms, more particularly pointed out in the claims.

Figure 1:
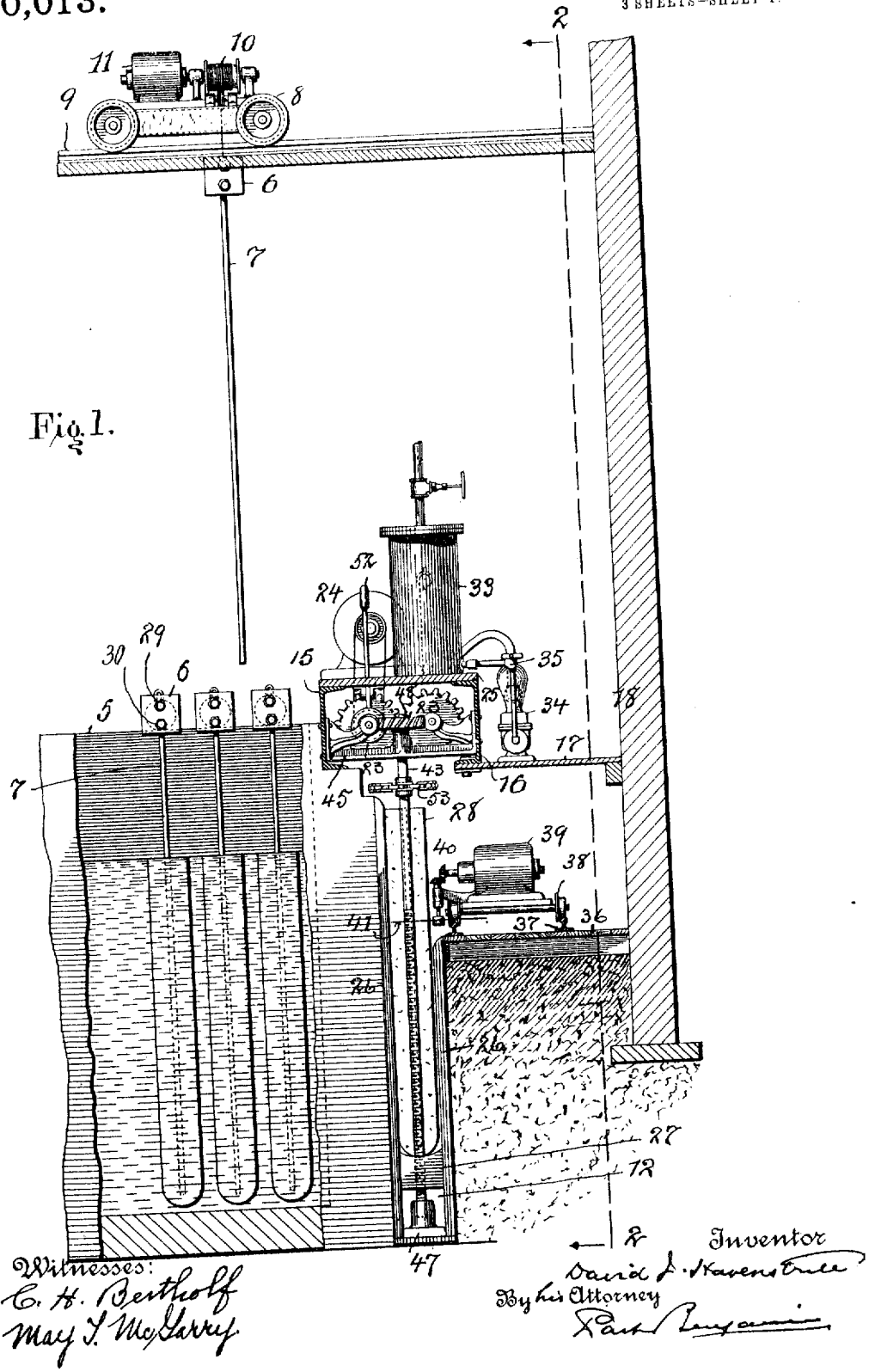
Figure 2:
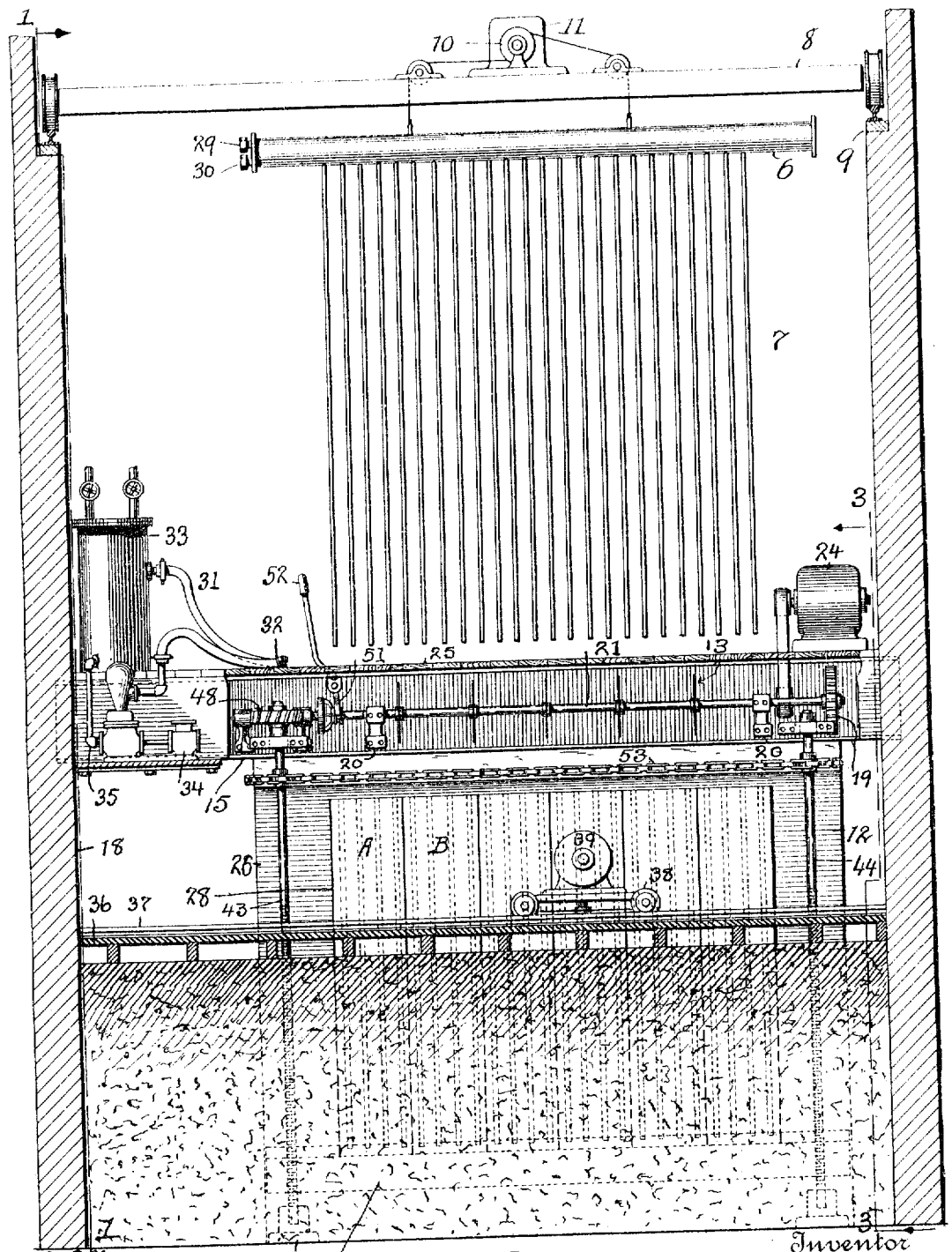

In the accompanying drawings—Figure 1 is a section of the apparatus on the line 1 1 of Fig. 2, the near edge of the freezing tank being broken away. Fig. 2 is a section on the line 2 2 of Fig. 1, the side of one of the supporting guides being broken away. Fig. 3 is a section on the line 3 3 of Fig. 2. Fig. 4 is a section on the line 4 4 of Fig. 3. Fig. 5 is a plan view.

Similar numbers of reference indicate like parts.

The general construction of the freezing tank 5, transverse headers 6 and parallel tubes 7 depending from said headers, is substantially the same as set forth in U. S. re-issued Letters Patent No. 12,808, granted to me June 9, 1908. As fully described in said patent, the ice is formed upon the depending tubes 7 in which a refrigerating medium circulates. The cylinders produced on the individual tubes connected to each header coalesce to form ice cakes, free from the sides and bottom of the tank. As soon as each cake is brought to a sufficient thickness, the header, tubes and ice cake adherent to said tubes, are raised from said tank by means of a traveling overhead crane. The crane preferably consists of a carriage 8 running on ways 9, and having a winding drum 10 operated by an electric motor 11. The cord or chain on the drum is connected to suitable eyes on the header 6 and by rotating the drum, the header, tubes and adherent ice cake are lifted clear of the tank. The carriage is then moved along the ways 9 until the suspended cake is over the cutting pit 12 which is preferably located immediately adjacent to the end of the freezing tank 5. The cake is then lowered downward into said pit, and during the descent, is fed between the gangs of circular saws 13 and 14, which saws enter between the supporting tubes 7 and divide said cake into a number of vertical strips.

The saws 13, 14 are supported and operated in the following manner; 15 is a girder supported on the edge of freezing tank 5. 16 is a facing girder supported on the ledge 17 projecting from the wall 18 of the building. On the girder 15 are brackets 20 in which is journaled the shaft 21, which carries the gang 13 of circular saws. On the girder 16 are brackets 22 in which is journaled the shaft 23, which carries the gang 14 of circular saws. The saws of gang 14 are in the same vertical plane as the saws of gang 13 (see Figs. 4 and 5), so that the opposite saws of a pair each divide approximately half the thickness of the cake, as said cake is lowered down upon and between them. Rotary motion is imparted to shaft 21 by means of a belt from the electric motor 24 which is supported on a floor 25 laid on both girders 15, 16, and said motion is transmitted to the shaft 22 by means of the intermeshing gears 23.

The width of the pit 12 is but little more than the thickness of the ice cake, so that said cake is supported in a vertical position, and is guided during its descent by the side linings 26 in said pit. In said pit is a vertically movable bottom piece or support 27 preferably concave on its upper side, and in said concavity the lower edge of the ice cake 28 is received after said ice cake has been divided into vertical strips by the saws 13, 14, the support 27 then being at the bottom of the pit, as shown in Figs. 1, 2, 3. The next step is to remove the tubes 7 from the ice cake 28. It is, of course, to be understood that before the header, tubes and adherent cake are raised from the tank, as already described, the pipes which convey refrigerating liquid to and from the header (which pipes are here not shown, but are attached to the couplings 29, 30, of each header) are disconnected. After the cake has been vertically divided, the ends of flexible pipes 31, 32, Fig. 2, are connected to said couplings. Pipe 31 leads from a warm liquid tank 33 supported on floor 25. Pipe 32 leads from the delivery of a pump 34 supported on ledge 17, the suction pipe 35 of said pump being connected to said tank 33. The pump 34 being set in operation, warm liquid from tank 33 is caused to circulate through the header and tubes and back to said tank. In this way the ice cake is thawed off from its supporting tubes, and then said tubes and header are raised from the cake, as shown in Figs. 1 and 2, and transported back to the freezing tank for re-immersion.

In Fig. 2, the dotted lines in the divided ice cake 28 indicate the holes left in the cake after the tubes have been removed, and the dark lines, the vertical divisions made by the saws 13, 14, during the descent of the cake into the pit 12, as already described. The ice cake is now divided horizontally to produce a number of blocks of suitable size for commercial handling, by the following means. On the floor 36 are laid tracks 37 on which runs a carriage 38, which supports an electric motor 39, the shaft of which, by means of bevel gearing 40, rotates the vertical shaft of a horizontal circular saw 41. Said saw shaft is supported in a bracket on said carriage 38. The carriage is moved by hand beyond one vertical edge of the ice cake, and the motor is set in operation. The carriage is then pushed along the track until the saw meets the cake and then is fed onward, still by hand, or by any other convenient means, until the saw has completed a horizontal division of said cake. The ice blocks A, B, etc., Fig. 2, above this horizontal division are then lifted off and removed. The saw 41 is retracted to its starting point and the cake is elevated in the pit for a suitable distance, ready for the saw to make a new horizontal cut.

The elevation of the cake is effected by the following means. 43 and 44 are vertical threaded shafts journaled in cross-bars 45, 46, extending between girders 15, 16, and having their lower ends in steps 47 at the bottom of pit 12. The threaded portions of said shafts are received in threaded openings in the bottom piece or support 27, so that when said shafts are rotated in one direction, said support is raised, and when rotated in the other direction, said support is lowered. On the upper end of shaft 43 is a pinion 48 which engages with a worm 49 on a short shaft 50, Fig. 5, journaled in brackets on girder 15. Shaft 50 is in line with saw shaft 21 and may be connected thereto at will by any suitable clutch 51, Fig. 2, operated by handle lever 52. Motion is imparted from shaft 43 to shaft 44 by means of a chain belt 53 passing over sprocket wheels on said shafts.

While the ice cake is being lowered into the pit and subjected to the action of the saws 13, 14, the clutch 51 is disconnected, so that the shafts 43 and 44 are not then operated. When it is desired to raise the cake for a new cut to be made by the horizontal saw 41, the clutch 51 is connected, and then by the rotation of shafts 43 and 44, the support 27 carrying the cake is raised to the desired point. The saw 41 is then operated as before, the blocks removed, the cake again raised and so on until the division of the whole cake into blocks is completed.

I claim:

1. In a plate ice harvesting and cutting apparatus, two parallel horizontal shafts, oppositely disposed circular saws on said shafts, means for supporting and lowering an ice cake between said shafts to be vertically divided by said saws and means for guiding said cake during its descent.

2. In a plate ice harvesting and cutting apparatus, two parallel horizontal shafts, oppositely disposed circular saws on said shafts, means for supporting and lowering an ice cake between said shafts to be vertically divided by said saws, and a receptacle for said ice cake below said saws, constructed to receive and guide said ice cake during its descent.

3. In a plate ice harvesting and cutting apparatus, means for lowering an ice cake, means for dividing said cake vertically during the lowering thereof, means for horizontally dividing said vertically divided cake, and mechanism for raising said divided cake to expose new portions thereof to said horizontal dividing means.

4. In a plate ice harvesting and cutting apparatus, means for lowering an ice cake, a motor, means actuated by said motor for dividing said cake vertically during the lowering thereof, means for horizontally dividing said vertically divided cake, mechanism actuated by said motor for raising said divided cake to expose new portions thereof to said horizontal dividing means, and means for disconnecting at will said raising mechanism from said motor.

5. In a plate ice harvesting and cutting apparatus, two rotary parallel shafts, oppositely disposed circular saws on said shafts, and means for supporting and lowering an ice cake between said shafts: whereby said ice cake is divided by said saws vertically and from opposite sides.

6. In a plate ice harvesting and cutting apparatus, means for holding an ice cake in vertical position, fixed guide ways disposed transversely across the face of said cake, a carriage movable on said ways and a rotary horizontal circular saw on said carriage.

7. In a plate ice harvesting and cutting apparatus, means for holding an ice cake in vertical position, means for raising said cake, fixed guide ways disposed transversely across the face of said cake, a carriage movable on said ways and a rotary horizontal circular saw on said carriage.

8. In combination with a receptacle and means for supporting and lowering an ice cake therein, means for dividing said cake vertically during said lowering, and means for dividing said cake horizontally while zontal dividing means.

9. In combination with a receptacle and means for lowering an ice cake therein, means for dividing said cake vertically during said lowering, means for dividing said cake horizontally while held in said receptacle, and means for intermittently raising said cake in said receptacle to expose new portions thereof to the action of said horizontal dividing means.

10. In a plate ice harvesting and cutting apparatus, means for lowering an ice cake, means for vertically dividing said cake during said lowering, a receptacle for receiving said divided cake and for guiding the same during its descent, a vertically movable bottom piece in said receptacle, means for horizontally dividing said divided cake, and means for raising said bottom piece and cake thereon to present successive portions of said cake to the action of said horizontal dividing means.

11. In a plate ice harvesting and cutting apparatus, a receptacle for the ice cake, a vertically movable bottom piece in said receptacle, means for horizontally dividing said ice cake, and means for raising said bottom piece and cake thereon to present successive portions of said cake to the action of said horizontal dividing means.

12. In a plate ice harvesting and cutting apparatus, in combination with a header and a plurality of parallel tubes thereon, constructed to retain an adherent ice cake, means for raising and lowering said header, tubes and cake unitedly, means for supporting and lowering said cake and means acting on opposite sides of said cake for dividing said cake vertically and between said tubes during the lowering of said cake.

In testimony whereof I have affixed my signature in presence of two witnesses.

DAVID J. HAVENSTRITE.

Witnesses:
GERTRUDE T. PORTER,
MAY T. McGARRY.